US008533737B2

(12) United States Patent
Ricciardi et al.

(10) Patent No.: US 8,533,737 B2
(45) Date of Patent: Sep. 10, 2013

(54) SYSTEM AND METHOD FOR INTERFACING DISTRIBUTED SYSTEMS WITH DIFFERENT FRAMEWORKS

(75) Inventors: Aleta Ricciardi, Windsor, NJ (US); Michael Ogg, West Windsor, NJ (US)

(73) Assignee: Global Infotek, Inc., Reston, VA (US)

( * ) Notice: Subject to any disclaimer, the term of this patent is extended or adjusted under 35 U.S.C. 154(b) by 1750 days.

(21) Appl. No.: 11/083,252

(22) Filed: Mar. 17, 2005

(65) Prior Publication Data
US 2005/0267952 A1 Dec. 1, 2005

Related U.S. Application Data

(60) Provisional application No. 60/554,233, filed on Mar. 18, 2004.

(51) Int. Cl.
*G06F 13/00* (2006.01)
*G06F 15/16* (2006.01)

(52) U.S. Cl.
USPC ........................................... 719/311; 719/330

(58) Field of Classification Search
USPC .................. 719/328, 330, 315, 311, 331, 332
See application file for complete search history.

(56) References Cited

U.S. PATENT DOCUMENTS

| 6,269,373 | B1* | 7/2001 | Apte et al. ..................... 707/10 |
| 6,272,557 | B1* | 8/2001 | Lim et al. ...................... 719/315 |
| 6,347,342 | B1* | 2/2002 | Marcos et al. ................. 719/315 |
| 6,845,393 | B1* | 1/2005 | Murphy et al. ................ 709/220 |
| 7,028,312 | B1* | 4/2006 | Merrick et al. ................ 719/330 |
| 7,194,543 | B2* | 3/2007 | Robertson et al. ............. 709/226 |
| 7,246,358 | B2* | 7/2007 | Chinnici et al. ............... 719/315 |
| 7,426,729 | B2* | 9/2008 | Avvari et al. .................. 718/104 |
| 7,428,590 | B2* | 9/2008 | Miller et al. ................... 709/225 |
| 2002/0049749 | A1* | 4/2002 | Helgeson et al. ................. 707/3 |
| 2002/0169852 | A1* | 11/2002 | Schaeck ........................ 709/218 |
| 2003/0163450 | A1* | 8/2003 | Borenstein et al. ............. 707/1 |
| 2003/0177225 | A1* | 9/2003 | Brown et al. .................. 709/224 |
| 2003/0204645 | A1* | 10/2003 | Sharma et al. ................ 709/328 |
| 2004/0215621 | A1* | 10/2004 | Harvey et al. .................. 707/10 |
| 2004/0215828 | A1* | 10/2004 | Li et al. ......................... 709/246 |
| 2005/0044197 | A1* | 2/2005 | Lai ................................ 709/223 |

* cited by examiner

*Primary Examiner* — H S Sough
*Assistant Examiner* — Phuong Hoang
(74) *Attorney, Agent, or Firm* — KED & Associates, LLP

(57) ABSTRACT

An improved method and system for interfacing two distributed computing systems each implemented using different frameworks and different protocols. A gateway service provides some of the other services operating on a first system with software proxies capable of translating commands from clients in a second system. The gateway service also registers the first system's services with the registry service of the second system. Clients in the second system are thereby able to locate services in the first system and send commands in their native protocols to the first system services. Services in the first system are capable of, by use of the proxies, receiving, processing and responding to commands from the second system clients.

16 Claims, 9 Drawing Sheets

SYSTEM AND METHOD FOR INTERFACING DISTRIBUTED SYSTEMS WITH DIFFERENT FRAMEWORKS

CROSS REFERENCE TO RELATED APPLICATIONS

This application claims the benefit of U.S Provisional Application Ser. No. 60/554,233 filed on Mar. 18, 2004.

STATEMENT REGARDING FEDERALLY SPONSORED RESEARCH

The present invention was not developed with the use of any Federal funds, but was developed independently by the inventors.

BACKGROUND OF INVENTION

This invention generally pertains to interfacing two or more distributed systems that are based on different protocols. A distributed system is a collection of autonomous computing entities, hardware or software, connected by a communication medium. While often the computing entities are geographically dispersed, in some instances they might be separate processors in a multi-processor computer or even separate software routines executing in logically isolated memory space on the same computer. A computing entity need not be a traditional computer, but more generally can be any computing device, ranging from a large mainframe to a refrigerator or a cell phone. A distributed application is an application that executes on a distributed system and one in which parts of the application execute on distinct autonomous computing entities.

Whenever a distinct component of a distributed application requests something (e.g., a data value, a computation) of another component, the former is called a client and the latter is called a service. It is worth noting that the terms service and client are not exclusionary in that an item can be both a client and a service. For example, a routine that calculates the time between two events may be a client of a clock service; if the clock service then calls a routine that converts to Daylight Savings Time, the clock becomes a client and the Daylight Savings Time converter is its service.

Mobile code generally refers to a computer program that can be written on one platform and executed on numerous others, irrespective of differences in hardware, operating system, file system, and many other details of the execution environment. In addition to independence from the physical characteristics of the execution environment, a mobile program may move from one computing entity to another in the middle of its execution.

Mobile code may be pre-compiled, or compiled when it arrives at the execution platform. In the first case, numerous versions of the program must be written and compiled, then matched across run-time environments; this is mobile code in the letter, but not the spirit, of the definition. In addition, the same pre-compiled program cannot move from one platform to a different one during its execution. In the second, the program text may be distributed along with configuration scripts describing what to do in each execution environment. This distributes and delays the specificity of the pre-compiled option. The more interesting, and far more common approach exploits a standard virtual machine, which finesses all the issues of platform heterogeneity. The virtual machine is a program that itself mitigates the machine dependencies and idiosyncrasies, taking the raw program text and compiling it to a binary executable.

FIG. 1 shows a typical distributed application of the existing art based on the Jini/Java. While distributed computing systems of different protocols have different architectures and nomenclature, it will be instructive to describe the Jini architecture to provide an understanding of the functions of modern distributed computing applications. There are two clients 2, 4 and four services 10, 12, 14, 16 that the clients 2, 4 might need. Each service has a service proxy 10*a*, 12*a*, 14*a*, 16*a* which is a module of mobile code that can be used by clients to invoke that service. A service proxy 10*a*, 12*a*, 14*a*, 16*a* contains the code needed by a client 2, 4 to interact with a service. For instance if a service is a digital camera on a robotic arm, the interfaces might include Initialize( ), Zoom( ), Rotate( ) and Get_Picture( ). The service proxy 10*a*, 12*a*, 14*a*, 16*a* may also provide the expected return values for the service, which might include error codes as well.

In addition to clients 2, 4 and services 10, 12, 14, 16 distributed applications need some mechanism for clients to find services. Often such knowledge is assumed a priori, but many distributed applications use a registry, which in Jini is a lookup service. The lookup service 20 is a service with which the other services are registered or advertised to be available for use by clients. In a simple system, where there is no attempt to coordinate replicas of services, each new service registers with the lookup service 20 (in the case of replicas, the onus falls on the client to resolve conflicts and ambiguity). When a service 10, 12, 14, 16 registers, it provides information telling clients 2, 4 how to find it. Commonly, this is a physical location such as an IP address and port number, but in the most modern systems this can be as powerful as giving the lookup service 20 a service proxy 10*a*, 12*a*, 14*a*, 16*a*, which is mobile code that clients 2, 4 execute and use to invoke the services 10, 12, 14, 16. In this way, the service proxy 10*a*, 12*a*, 14*a*, 16*a* contains not only location information but instructions for how to use the service 10, 12, 14, 16. While just as necessary for the client 2, 4 as location information, this has generally been assumed as a priori knowledge. When a client 2, 4 wishes to work with a service 10, 12, 14, 16 it locates it through the lookup service 20, downloads the service proxy 10*a*, 12*a*, 14*a*, 16*a* for that service 10, 12, 14, 16 from the lookup service 20, then uses the service proxy 10*a*, 12*a*, 14*a*, 16*a* to invoke the service 10, 12, 14, 16. The lookup service 20 may also have attributes of the services 10, 12, 14, 16, such as whether it is a grouped service, what type of group it is, what its cost to use is, how accurate it is, how reliable it is, or how long it takes to execute. In such cases the clients 2, 4 can use the attributes to decide which of a number of services 10, 12, 14, 16 it wishes to use.

Each of the foregoing has access to a communication network 22 so that it is capable of communicating with at least some of the other members in the distributed computing application. The communication network 22 may be wireless, a local area network, an internal computer bus, a wide area network such as the Internet, a corporate intranet or extranet, a virtual private network, any other communication medium or any combination of the foregoing.

In the prior art example shown in FIG. 1, one client 2 is a roadway traffic monitoring program that notifies a user when and where traffic has occurred and the other client 4 is an automated toll collection program. The services are a clock 10, a road sensor 12 that monitors traffic flow on a highway, a toll booth sensor 14 that detects an ID device in each car that passes through the toll, and a credit card charge program 16. When each service 10, 12, 14, 16 becomes available to the application it registers with the lookup service 20 and provides the lookup service with its service proxy 10a, 12a, 14a, 16a.

When the traffic monitoring client 2 begins, it queries the lookup service to see if a clock is available and what sensors are available. The lookup service 20 responds by providing the client 2 with the clock proxy 10a, the road sensor proxy 12a and the toll booth sensor proxy 14a. The traffic monitoring client 2 uses the service proxies 10a, 12a, 14a to invoke the clock 10 and the sensors 12, 14, and then to monitor traffic at various times of the day.

Similarly when the toll collector client 4 begins, it queries the lookup service 20 to see if a toll booth sensor 14 and a credit card charge service 16 are available. The lookup service 20 responds by providing this client 4 with the toll booth sensor proxy 14a and the credit card charge proxy 16a. The toll collector client 4 uses the service proxies 14a, 16a, to invoke the toll booth sensor 14 and the credit card charge program 16, and then to identify cars that pass through the toll booth and charge their credit cards for the toll.

The foregoing description of a Jini based distributed computing system demonstrates several aspects of modern architectures. First there is some means for objects to discover each other, generically referred to as a registry, and implemented in Jini through the lookup service. For each object that registers, the registry stores a descriptor which contains information about the object. This may be as simple as a name or more complex such as a description of the attributes and classes of the service. The registry also stores the location in the distributed environment. Under Jini the descriptor and location are combined into the service proxy.

In many instances, there are two or more distributed systems based upon different frameworks that operate using different protocols. This may occur due to the existence of legacy systems, because of the merger of two different organizations, or when developing enterprise wide solutions from best-of-breed components. It may also occur when integrating an internal system with a public system.

As used herein a "protocol" is the set of predefined mechanisms that autonomous computing entities within a distributed computing system use to communicate and interact with each other. Each layer of abstraction in the system has a protocol (or suite of protocols) appropriate for it. For example, at the level of the operating system, raw socket communication with IP (the internet protocol) is used, whereas at the application layer and higher, frameworks with more comprehensive end-to-end semantics such as RMI (within J2EE and Jini distributed applications), and IIOP (within CORBA applications) are used. In any one application domain, the expected semantics and syntax of the protocol are natively understood, but to bridge between domains, translations ensuring the proper syntax and semantics are necessary.

A framework is a distributed system that consists of one or more protocols and a registry. A system is the hardware and software that implements the framework using the one or more protocols.

Generally, if two different protocols are being used a gateway of some sort is necessary between the two systems as shown in FIG. 2. This gateway 8 is also sometimes known as "middleware" and is also referred to as "protocol adapter" or "translator". The function of the gateway 8 is to translate communications between the two systems. In theory a gateway should translate all possible commands and responses available in the two systems. Since this is not practical, system designers generally choose a subset of commands and responses for the known objects in the systems and integrate these into the gateway prior to execution. New objects in either system generally cannot be handled by the gateway without adding new code to the gateway. FIG. 2 demonstrates commands from each system's clients passing through the gateway to services in the other system. Responses from the services may also pass back through the gateway to the clients in the other system (not shown).

While it is known in the prior art to have automated methods of writing portions of gateways, in general gateways are very labor intensive to design and code and very difficult to test. This is due, among other reasons, to the large number of commands and responses possible between two systems as well as the various possible logic state of either system.

BRIEF DESCRIPTION OF THE INVENTION

The invention is an improved method and system for interfacing two distributed computing systems each implemented using different frameworks (such as Jini, CORBA, Web Services or J2EE) and different protocols (such as RMI, IIOP or HTTP). A gateway service in a first system provides some of the other services also operating on the first system with software proxies capable of receiving and responding to commands from clients in a second system. Each proxy can translate between the two framework's different protocols for the subset of commands used by the service for which it is acting. The gateway service, in addition to providing these proxies, is also sufficiently knowledgeable about the second system so that it can register the first system's services, with the registry service of the second system. Thus, clients in the second system are capable of finding and locating services in the first system natively, that is by locating them in the second system's registry. The second system clients can send commands in their native protocols to the first system services, and the services in the first system are capable of by use of the proxies, receiving, processing and responding to commands from the second system clients. The first system may comprise a computer usable storage medium that includes various storage mediums (like disks or ROMs) and excludes various non-storage mediums (like transient signals in free space). The first system may comprise a computer usable storage medium that stores computer readable program code embedded therein.

DETAILED DESCRIPTION OF THE INVENTION

In the general method of this invention there are two (or more) distributed systems and is desirable to make the service in one system available to clients in the other system. The distributed systems are implemented using two different frameworks (such as Jini, CORBA, WebServices or J2EE) that use different protocols (such as RMI, IIOP or HTTP). Each distributed system advertises its services using its framework's registry. There is a gateway service in a first system that provides some services within its system with software proxies capable of receiving and responding to commands from clients in a second system. Each proxy can translate between the two framework's different protocols for the subset of commands used by the service for which it is acting. The gateway service, in addition to providing these proxies, is also sufficiently knowledgeable about the second system so that it can register the first system's services with the registry service of the second system. Thus, clients in the second system are capable of finding and locating services in the first system natively, that is by locating them in the second system's registry. The second system clients can send commands in their native protocols to the first system services, and the services in the first system are capable of, by use of the proxies, receiving, processing and responding to commands from the second system clients.

The details of this process will now be described, first for a generic System X to System Y gateway, and then for a specific Jini to WebServices gateway.

FIGS. 3a-3e show a generic implementation of the invention that interfaces between System X and System Y. Beginning with the prior art in FIG. 3, each system has a registry service 30, 32 and the ability to use mobile code. The two systems also share a common communication protocol such as SMTP. System X has two clients and a service, $Client_{X1}$ 40, $Client_{X2}$ 42, and $Service_{X1}$ 44. $Service_{X1}$ 44 is registered in the $Registry_X$ 30 so that it available to other System X clients. System X, may, and in most cases will, have many other services and clients, but the purpose of simplicity they are not shown. Likewise, in many cases clients as well as services will register with the registry, and there may be a plurality of registries within the system, but again for simplicity this is not shown.

System Y has two services and a client, $Service_{Y1}$ 46, $Service_{Y2}$ 48, and $Client_{Y1}$ 50. $Service_{Y1}$ 46 and $Service_{Y2}$ 48 are registered in $Registry_Y$ 32 so that they are available to other System Y clients. System Y, may, and in most cases will, have many other services and clients, but the purpose of simplicity they are not shown. Likewise, in many cases clients as well as services will register with the registry, and there may be a plurality of registries within the system, but again for simplicity this is not shown.

Figure 3A:
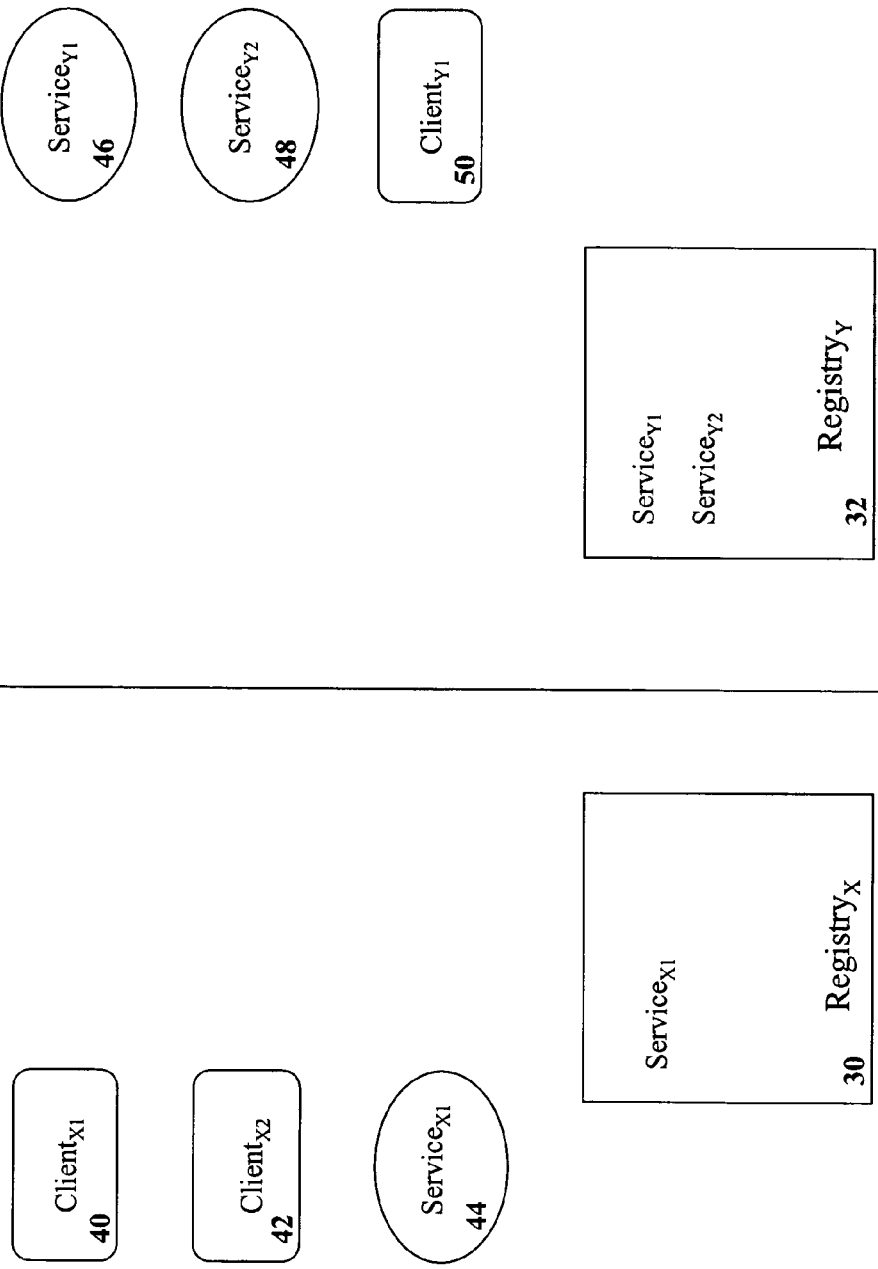
FIG. 3a show a prior art example of two distributed systems without a gateway.

Thus initially, as shown in prior art FIG. 3a, System X clients 40, 42 are capable of finding System X services 44 using the System X registry 30, and System Y clients 30 are capable of finding System Y services 46, 48 using the System Y registry 32. However, System X clients 40, 42 are not capable of finding or communicating with System Y services 46, 48 or vice versa.

Figure 3B:
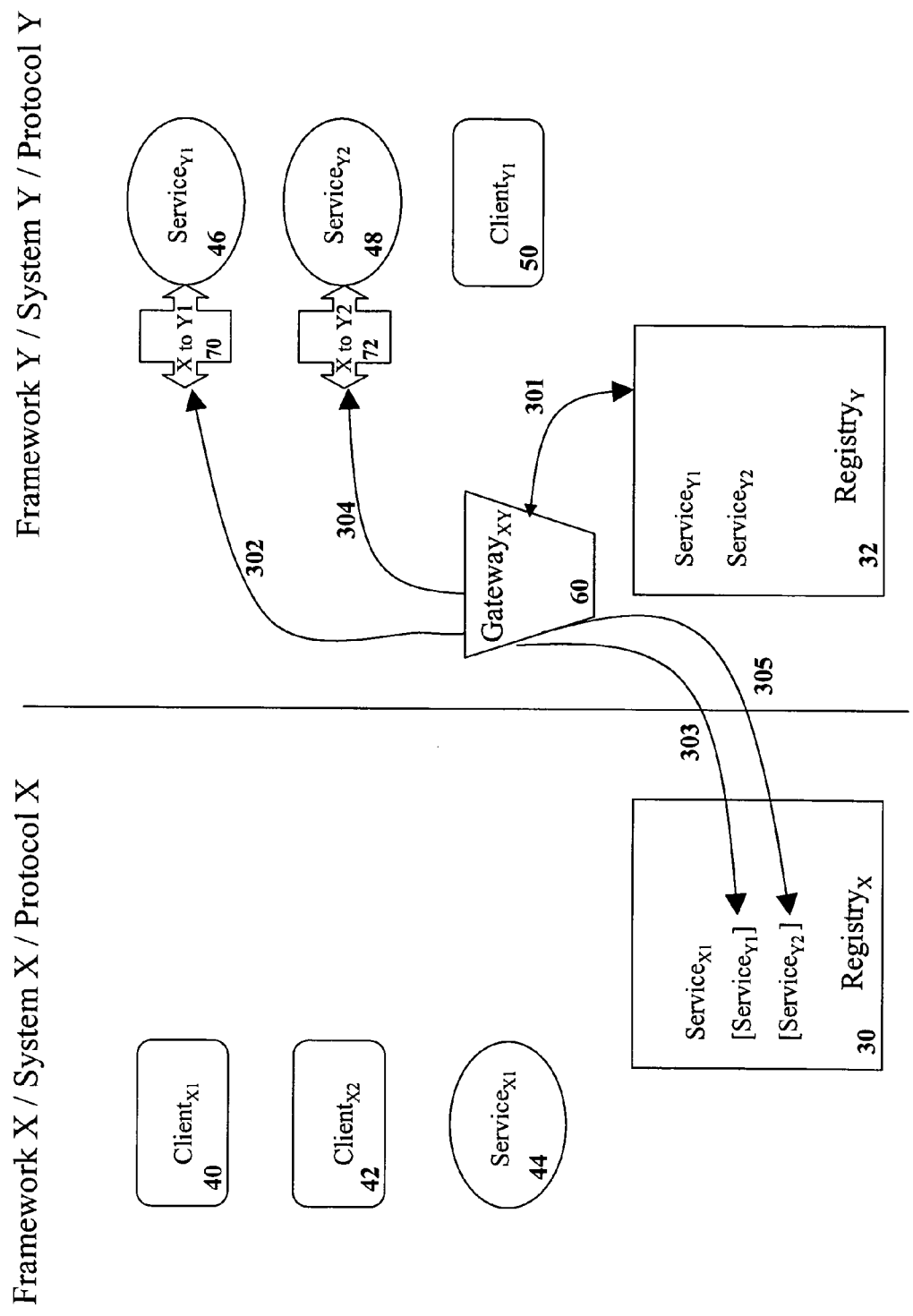
FIG. 3b shows exemplary Systems X and Y with a gateway service distributing proxies so the System X clients may communicate with System Y services.

$Gateway_{XY}$ Service 60, shown in FIG. 3b, resolves this problem by making System Y services available to System X clients. As a first step $Gateway_{XY}$ Service 60 reads $Registry_Y$ 32 to determine what services are available in System Y 301. It then determines for which of these services it has, can get, or can create an X to Y proxy. The proxy is a mobile code software module that allows a given System Y service to interpret commands from a System X client. Each proxy is specific to the service it is designed to work with and the System that it is acting as interpreter for. (Although, in some embodiments, the same proxy may be used for a plurality of services.) Instead of containing a translation of all System X commands, it only contains translations of System X commands that can be used by the System Y service it is designed to work with. Thus the proxy is much smaller than a universal protocol interpreter and therefore easier to write, test and debug, and therefore, hopefully, more robust and less prone to error. The proxy essentially acts as an "ear" allowing a particular service to receive and respond to commands from a System X client, even though those commands are still in System X protocol. Proxies for various services may be provided to the gateway service and stored by it prior to run time, the proxies may be available from some System Y library service that contains proxies for a plurality of services, they may be provided by a system operator during execution, or the gateway service may be capable of generating proxies for services using discovery and reflection tools, if they are available. The method of obtaining the appropriate proxy is not crucial to the invention and it will be assumed that the appropriate proxy is available to the gateway service.

Referring to FIG. 3b, $Gateway_{XY}$ Service 60 queries 301 $Registry_Y$ and determines that $Service_{Y1}$ 46 and $Service_{Y2}$ 48 are currently registered. It then locates $Proxy_{XtoY1}$ 70 and provides it 302 to $Service_{Y1}$. $Proxy_{XtoY1}$ 70 contains translations all (or less optimally, a portion of) commands from System X that can be used to invoke $Service_{Y1}$ into System Y1 protocol.

For example, suppose $Service_{Y1}$ 46 is a clock that is invoked in System Y1 protocol with the command "Get_Time( )" where it returns the time of day in minutes. Suppose also that in System X protocol, there are two equivalent commands "Find_Seconds( )" where it returns the time of day in seconds, and "Find_Minutes( )" where it returns the time of day in minutes. $Proxy_{XtoY1}$ sits "in front" of $Service_{Y1}$ 46 and intercepts all commands to and responses from $Service_{Y1}$ 46. If the command is a Y protocol command (ie., coming from a System Y Client 50), $Proxy_{XtoY1}$ 70 allows the command to pass directly through to $Service_{Y1}$ 46 unchanged, and allows the response to pass out unchanged. However if the incoming command is a Y protocol command, $Proxy_{XtoY1}$ 70 intercepts it and tries to interpret it. In this case if the incoming command "Find_Minutes( )" or "Find_Seconds( )", $Proxy_{XtoY1}$ 70 translates the command to "Get_Time( )" and passes that off to $Service_{Y1}$ 46. $Service_{Y1}$ 46 responds with the time of day in minutes. If the incoming command was "Find_Minutes( )", $Proxy_{XtoY1}$ 70 passes through the response unchanged. If the incoming command was "Find_Seconds( )", $Proxy_{XtoY1}$ 70 intercepts the response, multiplies it by sixty and sends the result out. This example used a very simple command, and commands exist with many input parameters, control switches, responses, status reports and error messages, however, the principals remain the same.

After providing $Service_{Y1}$ 46 with $Proxy_{XtoY1}$ 70, 302, $Gateway_{XY}$ Service 60 then registers 303 $Service_{Y1}$ with $Registry_X$ 30, making it available to all clients in System X. Note now that $Service_{Y1}$ 46 is registered in both $Registry_X$ 30 and $Registry_Y$ 32, so that clients in either system can call $Service_{Y1}$ simultaneously. $Gateway_{XY}$ Service (or some agent that it uses) should have sufficient knowledge of Protocol X so that it can register services with $Registry_X$ 30 using Protocol X. This level of information in this registration will depend upon the protocol. It may simply consists of the name and location of the available service (such as used in the WebServices protocol), it may contain a more detailed description of the service, or it may contain a set of commands that can be used with the service (such as used in Java/Jini).

Continuing in FIG. 3b, the Gateway$_{XY}$ Service 60 performs similar steps for Service$_{Y2}$ 48. It provides Service$_{Y2}$ 48 with Proxy$_{XtoY2}$ 72, 304 which contains Protocol X translations of commands to and responses from Service$_{Y2}$ 48. Gateway$_{XY}$ Service 60 then registers 305 Service$_{Y2}$ 48 with Registry$_X$ 30, making Service$_{Y2}$ 48 available to all clients 40, 42. in System X. Note that Gateway$_{XY}$ Service 60 need not have proxies for all services in System Y. If Gateway$_{XY}$ Service 60 does not have or cannot find or create the appropriate proxy for a particular service, it simply does not register that service in Registry$_X$ 30. While that service is not available System X clients, it still remains available to all System Y clients, and Gateway$_{XY}$ Service 60 can move on to the next service. Thus the inability to provide X to Y protocol translations for a particular service does not impede the Gateway$_{XY}$ Service 60 form providing protocol translations for other services.

Note that the particular sequence described above is exemplary and may be varied. For example, Gateway$_{XY}$ Service may first distribute all the proxies then cross-register all the services, instead of doing them one at a time.

Throughout this disclosure the registration of one system's client in another system's registry may be referred to as "cross registration." In the figures, services that are cross-registered will be so indicated by placing the service name in brackets within the registry. For example in FIG. 3b, Service$_{Y1}$ 46 and Service$_{Y2}$ 48 are cross-registered into Registry$_X$ 30.

Figure 3C:
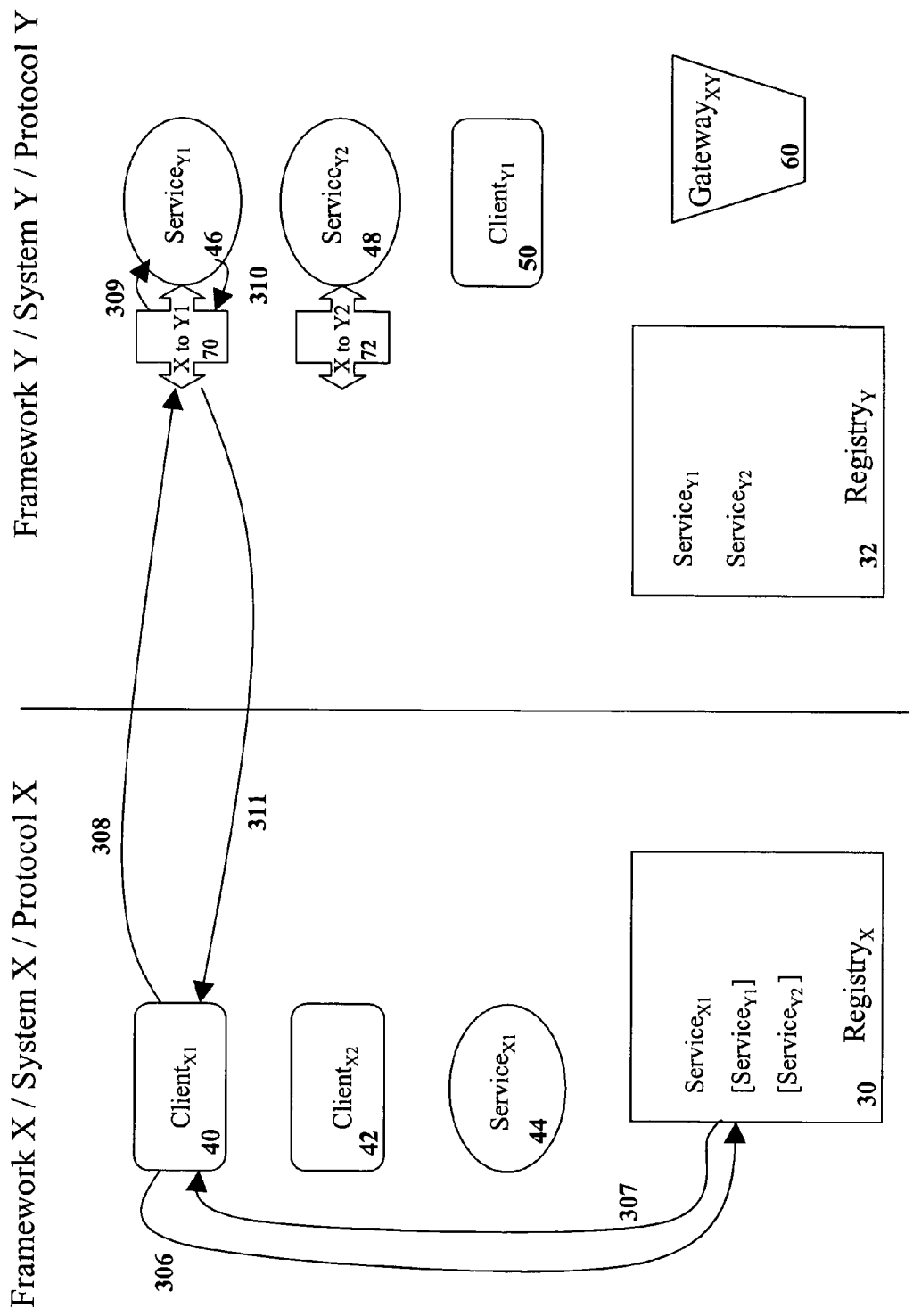
FIG. 3c shows exemplary Systems X and Y, with clients from System X calling clients form System Y.

The resulting configuration can be seen in FIG. 3c. Service$_{Y1}$ 46 and Service$_{Y2}$ 48 each have a specialized Protocol X to Y translator, Proxy$_{XtoY1}$ 70 and Proxy$_{XtoY2}$ 72, respectively. Service$_{Y1}$ 46 and Service$_{Y2}$ 48 are registered in both the System X registry, Registry$_X$ 30, and the System Y registry, Registry$_Y$ 32. Service$_{Y1}$ 46 and Service$_{Y2}$ 48 are now available to Client$_{X1}$ 40, Client$_{X2}$ 42 and Client$_{Y1}$ 50. The elegance of this architecture is that Service$_{Y1}$ 46 and Service$_{Y2}$ 48 appear to Client$_{X1}$ 40 and Client$_{X2}$ 42 completely as if they were System X services using Protocol X. Service$_{Y1}$ 46 and Service$_{Y2}$ 48 are available in the System X registry 30 and can be called using Protocol X commands.

For example, suppose again that Service$_{Y1}$ 46 is a clock. Now Client$_{X1}$ 40 needs a clock. It queries 306 Registry$_X$ 30 to see if there are any clocks, and is given 307 the registry entry (which includes, at a minimum, a description and the address of Service$_{Y1}$). Client$_{X1}$ 40 sends a command, "Find_Seconds( )", using Protocol X to Service$_{Y1}$ 46, 308. Proxy$_{XtoY1}$ 70 intercepts the commands, translates it into a Protocol Y command, "Get_Time( )", and sends this command to Service$_{Y1}$ 46, 309. Service$_{Y1}$ 46 responds with the time of day in minutes 310. Proxy$_{XtoY1}$ 70 intercepts the response, multiplies it by sixty, so that it is in the format requested in Protocol X (i.e. seconds), and sends the result back to Client$_{X1}$ 40, 311.

Figure 1:
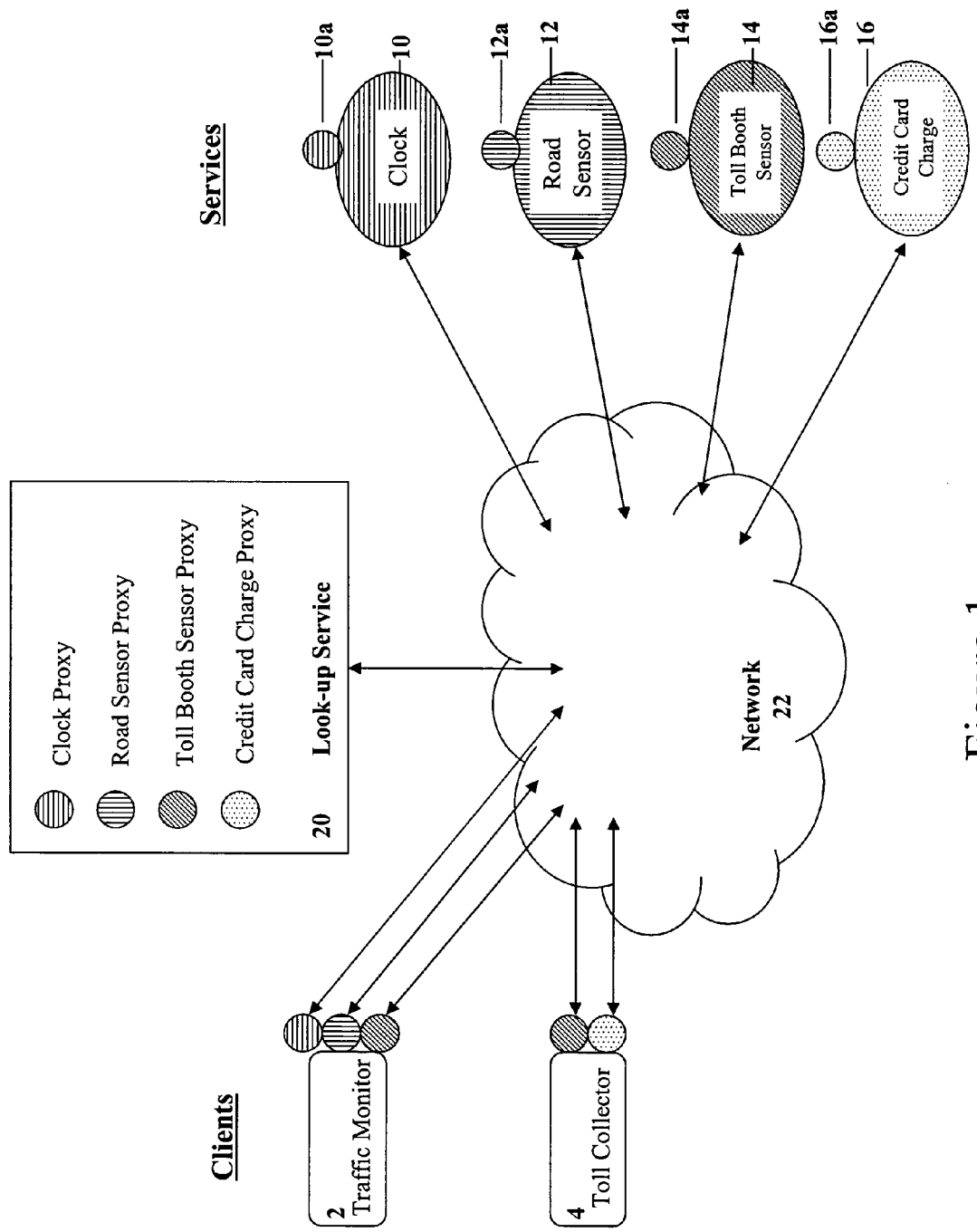
FIG. 1 shows a prior art example of a distributed computing application.
Figure 2:
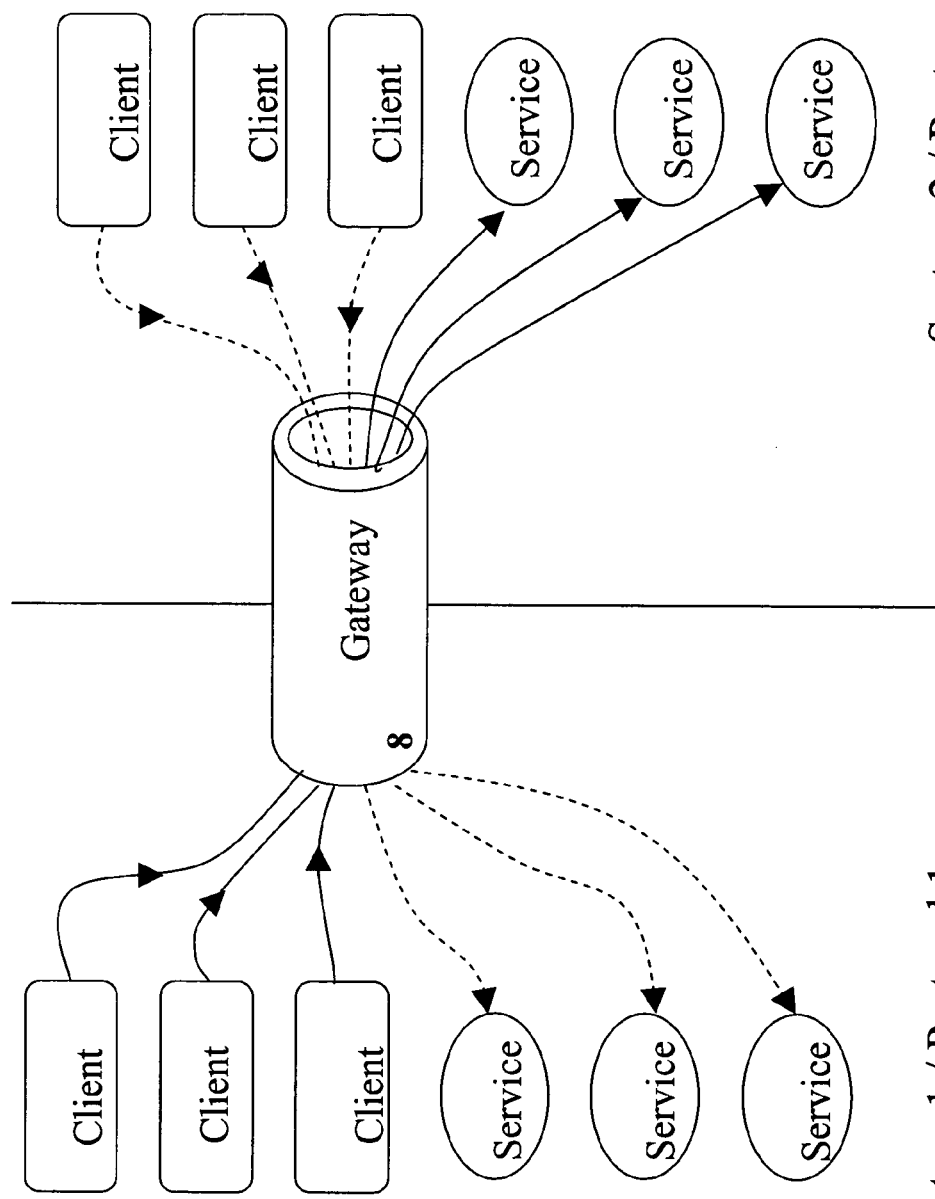
FIG. 2 shows an example of two distributed systems with a prior art gateway between them.

Several improvements over the prior art should be noted. In the prior art a single translator protocol adapter/gateway (see 8 in FIG. 2) was used to translate all commands moving from System X to System Y. This created a huge bottleneck as all calls and responses had to run through a single translator. This also created a single point of failure. Likewise the single translator was a daunting programming task because it had to handle virtually all commands. The complexity of this translator and the number of situations it needed to handle increased the likelihood of failures. Even if this task was broken among several translators (such as one gateway for X to Y traffic and one gateway for Y to X traffic) the complexity of distributing the work (such as selecting the correct translator) and coordinating timing would be daunting.

The method of this invention breaks and distributes the task of translation down to logically distributed processes: a separate process for each service. This avoids processing bottlenecks and creates a more robust and scalable system architecture because the translation is handled by each of the proxies. A failure of any given proxy will only effect its service, not the other services. Even a programming flaw, will only effect services using the same proxy. Other services should be unaffected. In addition, as pointed out above, each given proxy, is simpler to code, test and debug because it has to handle few commands and responses.

Figure 3D:
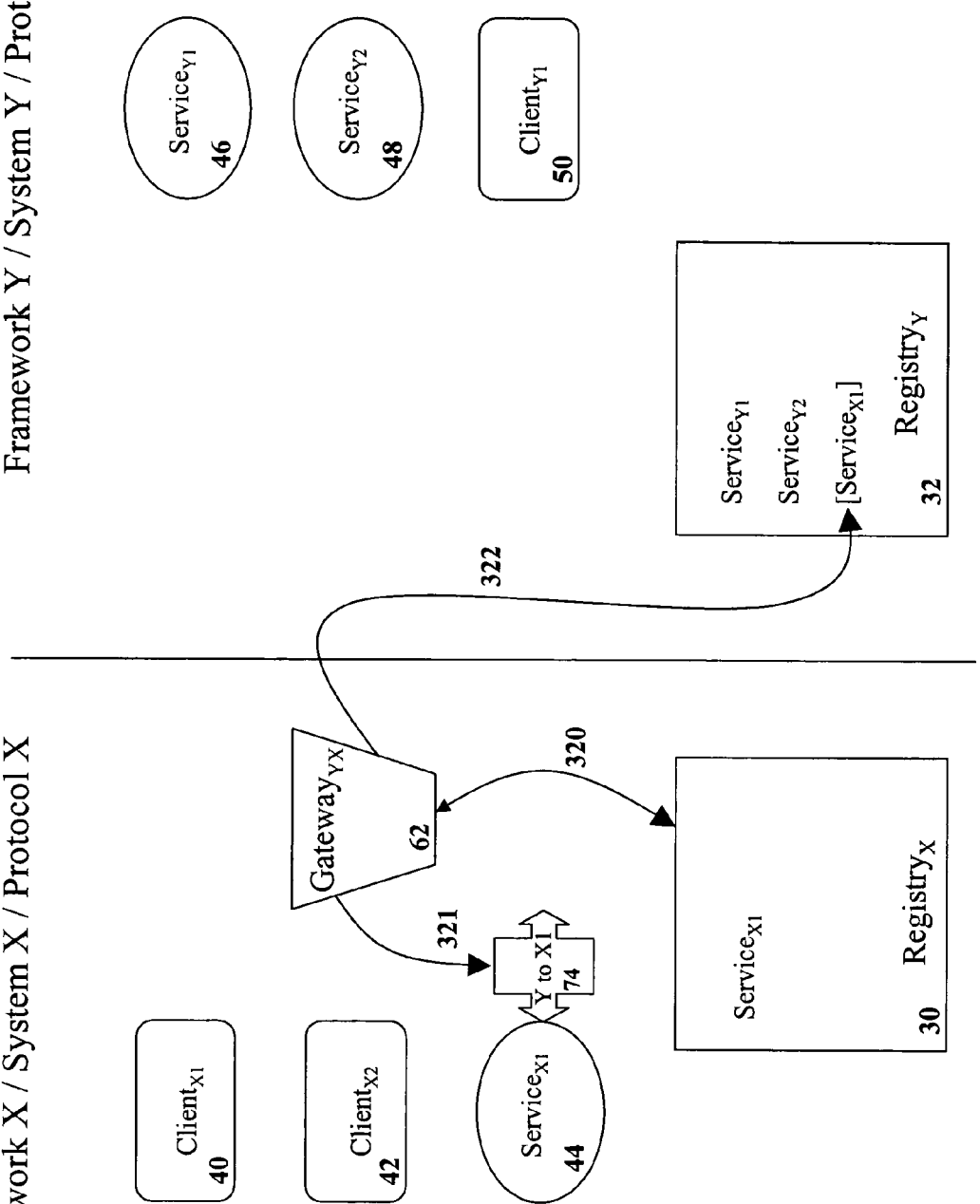
FIG. 3d shows exemplary Systems X and Y with a gateway service distributing proxies so the System Y clients may communicate with System X services (the inverse of FIG. 3b).

The System X to System Y translation discussed above can of course be reversed to make System X services available to System Y clients as shown in FIG. 3d. Now there is a Gateway$_{YX}$ Service 62 which queries 320 Registry$_X$ 30 and determines that Service$_{X1}$ 44 is available. Gateway$_{YX}$ Service 62 provides Proxy$_{YtoX1}$ 74 to Service$_{X1}$ 44, 321 and then registers 322 Service$_{X1}$ 44 with Registry$_Y$ 32. As before, Service$_{X1}$ 44 winds up being registered in both Registry$_X$ 30 and Registry$_Y$ 32, and therefore available to both System X and System Y clients 40, 42, 50. In particular, Client$_{Y1}$ 50 can now locate Service$_{X1}$ 44 in the System Y registry 32, and call Service$_{X1}$ 44 without ever knowing that Service$_{X1}$ 44 is not a System Y service.

Figure 3E:
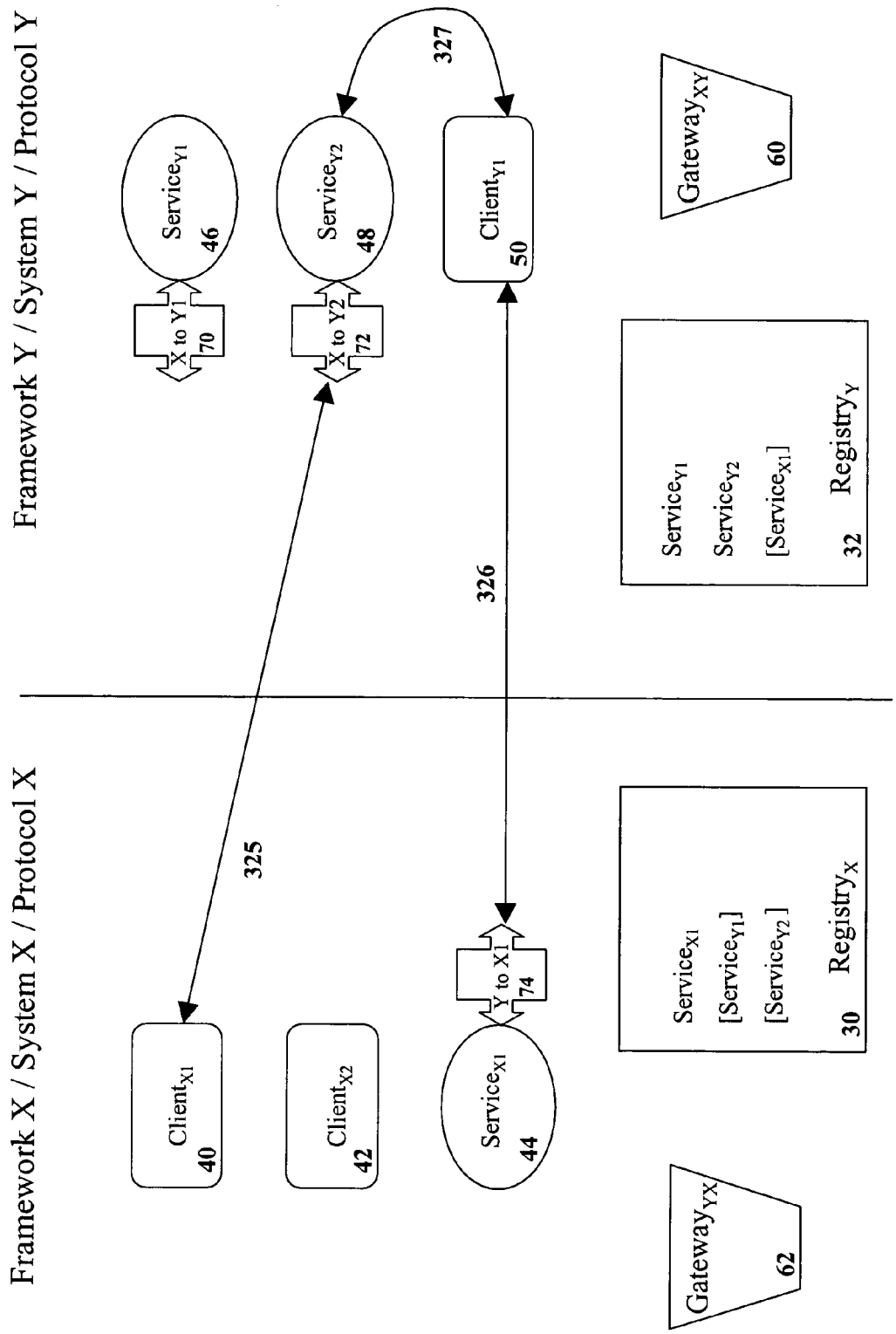
FIG. 3e shows exemplary Systems X and Y with both systems clients being able to call services in the other system.

FIG. 3e shows result System X and System Y using the invention both ways, thus having Gateway$_{XY}$ Service 60 and a Gateway$_{YX}$ Service 62. FIG. 3e shows the state of both Systems once the gateway services 60, 62 have distributed all of the proxies 70, 72, 74 and cross-registered the services 44, 46, 48 in each of the registries 30, 32. Note that each systems services 44, 46, 48 are registered in both registries 30, 32 and can be called by any of the clients 40, 42, 50 in either system regardless of the protocol. For example Client$_{X1}$ 40 can call 325 Service$_{Y2}$ 48 (Proxy$_{XtoY2}$ 72) or Client$_{Y1}$ 50 can call 326 Service$_{X1}$ 44 (via Proxy$_{YtoX1}$ 74). Of course clients within a system can call services in the same system, such as Client$_{Y1}$ 50 calling 327 Service$_{Y2}$ 48. Also note that once the proxies 70, 72, 74 have been distributed, the gateway services 60, 62 are no longer involved in the communication between the systems. Of course as services enter and leave a system the gateway services may again become involved to distribute or collect proxies and register or deregister services.

Figure 4:
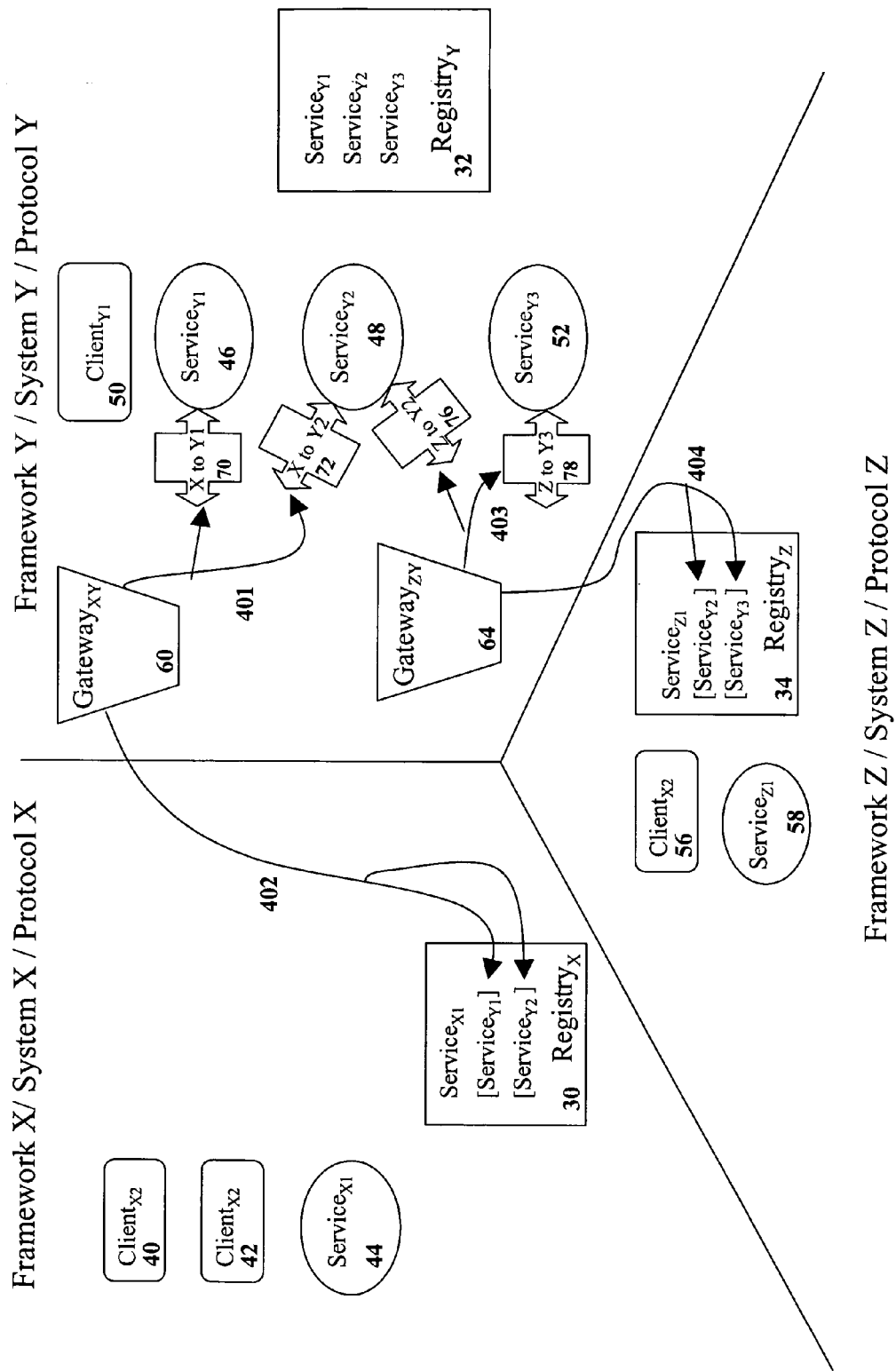
FIG. 4 shows exemplary Systems X, Y and Z, with services from System Y being available to clients in System X and System Z.
Figure 5:
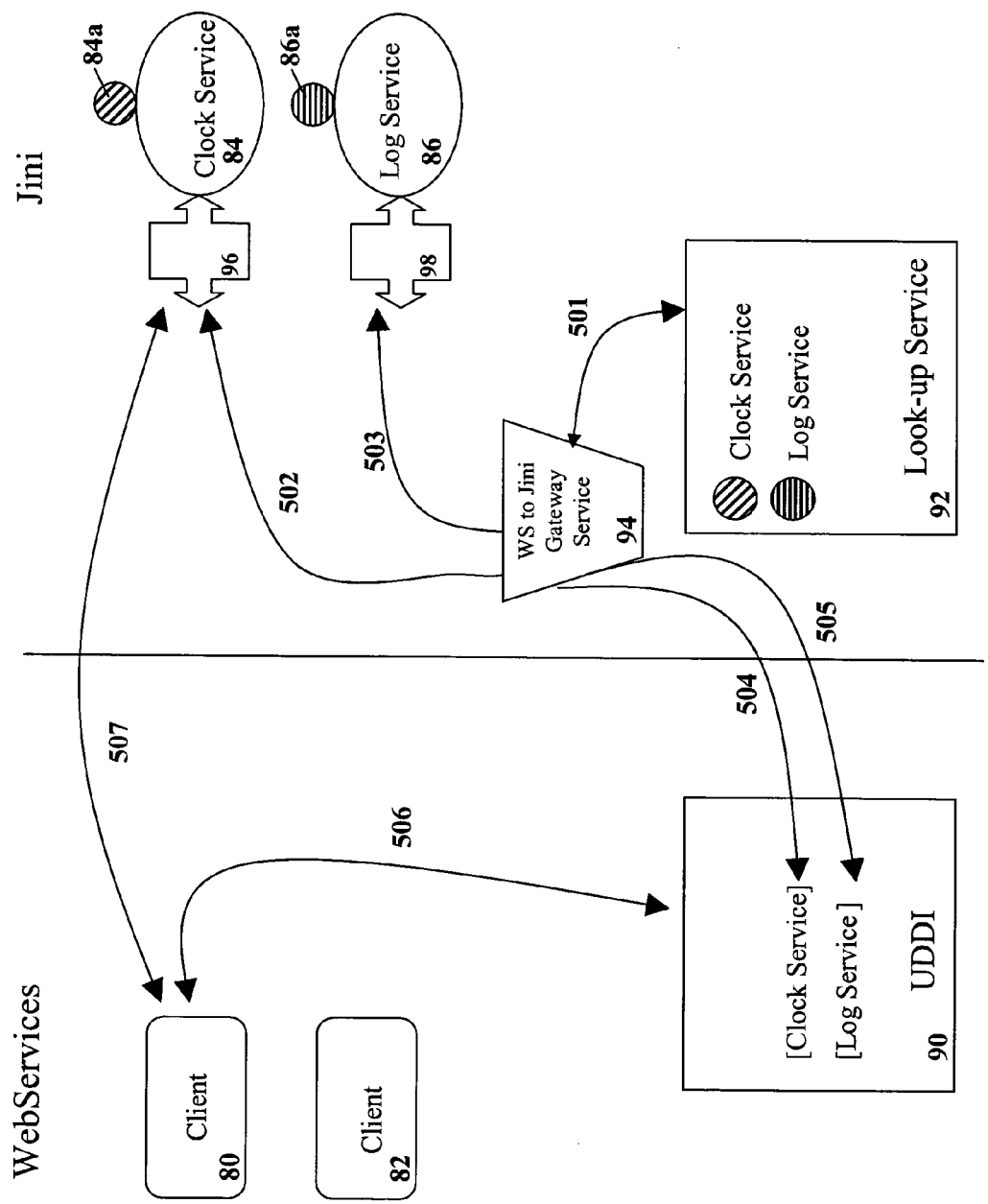
FIG. 5 shows a specific implementation of the invention for interfacing between a system based on a WebServices framework and a system based on a Jini framework.

It is also possible for a given service to be provided with more than one proxy, allowing a service to be available to two other systems, as shown in FIG. 4. In this configuration, there are three different systems, System X, System Y and System Z, each using a separate protocol. GatewayService$_{XY}$ 60 and GatewayService$_{ZY}$ 64 both operate on the System Y services. GatewayService$_{XY}$ 60 provides Service$_{Y1}$ 46 and Service$_{Y2}$ 48 with proxies for commands for System X, Proxy$_{XtoY1}$ 70 and Proxy$_{XtoY2}$ 72, respectively 401. GatewayService$_{XY}$ 60 also registers Service$_{Y1}$ 46 and Service$_{Y2}$ 48 with Registry$_X$ 30, 402. Similarly, GatewayService$_{ZY}$ 64 provides Service$_{Y2}$ 48 and Service$_{Y3}$ 52 with proxies for commands for System Z, Proxy$_{ZtoY2}$ 76 and Proxy$_{ZtoY3}$ 78, respectively 403. GatewayService$_{ZY}$ 64 also registers Service$_{Y2}$ 48 and Service$_{Y3}$ 52 with Registry$_Z$ 32, 404. Note that Service$_{Y2}$ 48 is registered in three different system registers, its own (Registry$_Y$ 32), as well as two others (Registry$_X$ 30 and Registry$_Z$ 34). Thus Service$_{Y2}$ 48 is available to clients 40, 42, 50, 56 in all three Systems, each using its native protocol. While in this particular embodiment only one of the services was registered into two other systems, this is by no means a limitation. It will be obvious to those skilled in the art that any combination of cross-registration of services are possible. The same principals can be used to extend this method to cross registration of four or more Systems.

While in the previous descriptions it might have been assumed that the gateway service checks the registry only once and then completes its task of distributing protocol proxies and cross registering services, this need not be the case. A gateway service can continue to operate, monitoring one or more registries so that as new services become available in the distributed system, the gateway service can also provide protocol proxies to these new services and cross register them. Likewise, as services leave a system, the gateway service can collect (i.e. terminate) the appropriate proxies and deregister the services in other system's registers. In system, such as Jini, where the registers (i.e., lookup service) use leases, the gateway service may remain active to continue to renew the leases of the services it has cross registered.

The invention will now be described as implemented for a gateway service that makes Jini (System Y) services available to WebServices (System X) clients. The WebServices ("WS") system has 2 clients. The Jini system has 2 services, a clock and a log. The WS-to-Jini GatewayService reads queries the Jini lookup service (the registry) and determines there are two services available for which it has WS protocol proxies. It then provides $Proxy_{WStoJini\_Clock}$ to the Clock service, $Proxy_{WStoJini\_Log}$ to the log service. Following this it registers the Jini clock and log services with the WebServices UDDI (Universal Discovery, Description and Interface, the equivalent of a registry). The registration is done by providing a WSDL (Web Services Descriptor Language) description of the clock and log services in the UDDI along with URLs giving their locations. The WS service can obtain the WSDL and URL for the clock and log services and interact with them as if they were WebServices services. The two protocol proxies handle translation of communication to and from WebServices protocol to Jini Protocol.

The method of this invention can be used to bridge many different types of distributed systems, including WebServices, Jini, CORBA and J2EE. To be bridgeable each system must include a registry where available services are listed, a means of providing the registry with a description and location of the available services, as well as some common form of wire protocol. Table 1 describes this for each of the listed systems. (The entries in the table are given by way of example and are not meant as limitations.)

TABLE 1

|  | Java | WebServices | CORBA | J2EE |
| --- | --- | --- | --- | --- |
| Registry | Lookup Service | UDDI | COSNaming | JNDI |
| Description | Service Item | WSDL | IDL | IDL or Java interface |
| Location | Service Proxy | URL | IOR | IOR or host: port |
| Wire Protocol | Many | http, https, or smtp | IIOP | RMI or IIOP |

One particular advantage to a Jini based system is that protocol proxies can be generated by the gateway service at run time or during execution of the program by using discovery and reflection.

Although further specific implementations of bridging systems based on these various protocols will not be given, it will be obvious to those skilled in the art of distributed computing that many permutations of interfaces between these systems can be designed. In addition, other frameworks and protocols, either currently existing or yet to be developed may be interfaced using the method described herein, and all such frameworks and protocols are meant to be within the scope of the disclosed invention.

It is understood that the invention is not limited to the disclosed embodiments, but on the contrary, is intended to cover various modifications and equivalent arrangements included within the spirit and scope of the appended claims. Without further elaboration, the foregoing will so fully illustrate the invention, that others may by current or future knowledge, readily adapt the same for use under the various conditions of service.

We claim:

1. A method for communicating between a first distributed computing system based upon a first framework and a first protocol and a second distributed computing system based upon a second framework and a second protocol, the first computing system and first protocol being incapable of communicating with the second computing system and second protocol, the communication method comprising:
   locating a first service in the first system, the first system having a gateway service that advertises the first service by a first registry in the first system;
   obtaining a proxy that acts as an interface directly with the first service to the second framework without passing through the gateway service and translates between the first and second protocols;
   providing the proxy directly to the first service;
   registering the first service in a registry in the second system;
   a client in the second system using the registry to locate the first service; and
   the client in the second system using the second protocol and the first service in the first system using the first protocol to directly communicate with each other through the proxy, wherein there are a plurality of services operating in the first system and a unique proxy is provided for each of the services, each unique proxy translates between the first protocol and the second protocol for the service to which the unique proxy is provided, the client invoking a command in the second protocol on the first service, the proxy translating the command from the second protocol to the first protocol, passing the translated command directly to the first service without passing through the gateway service, and the first service executing the command.

2. The method of claim 1 wherein the step of locating a first service in the first system comprises querying a registry in the first framework.

3. The method of claim 1 wherein the registry is a lookup service, UDDI, cosnaming, or JNDI.

4. The method of claim 1 further comprising:
   the first service generating a response in the first protocol;
   the proxy translating the response from the first protocol to the second protocol; and
   passing the translated response directly to the client without passing through the gateway service.

5. The method of claim 1 wherein there are a plurality of clients operating in the second system.

6. The method of claim 1 wherein the frameworks are Java, Web services, CORBA or J2EE.

7. The method of claim 1 wherein the proxy is mobile code.

8. The method of claim 1 wherein the second system clients send commands using the second protocol to the first system services and the services in the first system directly receive, process, and respond to commands from the second system clients.

9. A distributed computer system comprising:

a first system implemented using a first framework, said first system comprising a computer usable storage medium having computer readable program code embedded therein for providing the framework, a first service, a first protocol, a proxy, and a first registry, the first service and the first registry communicating using the first protocol;

a second system implemented using a second framework, said second system comprising a client, a second protocol, and a second registry, the client and the second registry communicating using the second protocol;

the first computing system and first protocol being incapable of communicating with the second computing system and second protocol;

the proxy is configured to operate on the first system and act as an interface directly with the first service to the second framework; and a gateway system comprising a computer usable medium having computer readable program code embedded therein for providing a gateway service in communication with the first system and the second system, said gateway service being capable of advertising the first service by a first registry in the first system, locating the first service using the first registry, providing the proxy to the first service and registering the first service with the second registry; and the client in the second system using the second protocol and the first service in the first system using the first protocol to communicate with each other directly through the proxy without passing through the gateway service, wherein there are a plurality of services operating in the first system and a unique proxy is provided for each of the services, each unique proxy being capable of directly translating between the first protocol and the second protocol for the first service to which said unique proxy is provided without passing through the gateway service.

10. The system of claim 9 wherein the proxy is configured to translate a subset of the second framework commands, said subset being the subset necessary to communicate with the first service in the first framework.

11. The system of claim 9 wherein in the proxy is configured to translate commands in the second protocol from the client in the second system into the first protocol and passes the translated commands directly to the first service in the first system without passing through the gateway service.

12. The system of claim 11 wherein the proxy is configured to translate responses in the first protocol from the first service in the first system into the second protocol and pass the translated responses directly to the client in the second system without passing through the gateway service.

13. The system of claim 9 further comprised of a plurality of clients operating in the second system.

14. The system of claim 9 wherein the frameworks are Java, Webservices, CORBA or J2EE.

15. The system of claim 9 wherein the proxy is mobile code.

16. The system of claim 9 wherein the second system clients are capable of sending commands using the second protocol to the first system services and the services in the first system are capable of directly receiving, processing, and responding to commands from the second system clients.

* * * * *